United States Patent
Butsuen et al.

[11] Patent Number: 5,467,283
[45] Date of Patent: Nov. 14, 1995

[54] OBSTACLE SENSING APPARATUS FOR VEHICLES

[75] Inventors: Tetsuro Butsuen, Hiroshima; Tohru Yoshioka, Hatsukaichi; Hiroki Uemura, Kure; Tadayuki Niibe, Hiroshima; Ayumu Doi, Hatsukaichi; Ken-ichi Okuda, Hatsukaichi; Tomohiko Adachi, Hatsukaichi; Satoshi Morioka, Hiroshima, all of Japan

[73] Assignee: Mazda Motor Corporation, Hiroshima, Japan

[21] Appl. No.: 138,022

[22] Filed: Oct. 19, 1993

[30] Foreign Application Priority Data

Oct. 21, 1992 [JP] Japan ................................. 4-282724

[51] Int. Cl.$^6$ ................................. G06F 165/00
[52] U.S. Cl. .................... 364/461; 364/426.04; 340/903; 340/435; 180/169
[58] Field of Search .............. 364/426.04, 431.07, 364/460, 461; 180/167–169, 176–179; 123/352; 342/454, 455; 340/901, 903, 904, 435, 436

[56] References Cited

U.S. PATENT DOCUMENTS

| | | | |
|---|---|---|---|
| 4,519,469 | 5/1985 | Hayashi et al. | 180/169 |
| 4,670,845 | 6/1987 | Etoh | 364/461 |
| 5,233,527 | 8/1993 | Shinnosuke | 180/169 |
| 5,249,128 | 9/1993 | Markandey et al. | 364/461 |
| 5,314,037 | 5/1994 | Shaw et al. | 180/169 |

FOREIGN PATENT DOCUMENTS 51-7892  3/1976  Japan.

Primary Examiner—Gary Chin

[57] ABSTRACT

An obstacle sensing apparatus for vehicles is provided in which detection of obstacles is performed efficiently by predicting the traveling path of the vehicle appropriately when detection of obstacles by a radar unit is limited to a region along the traveling path. The apparatus is provided with a radar unit for transmitting radar waves ahead of the vehicle and sensing obstacles present ahead of the vehicle, a steering angle sensor for sensing the steering angle of the vehicle, and a yaw rate sensor for sensing the yaw rate produced by the vehicle. First traveling-path predicting device predicts a traveling path of the vehicle based upon the steering angle, and second traveling-path predicting device predicts a traveling path of the vehicle based upon the yaw rate. One of these traveling paths is selected in dependence upon the operating state of the vehicle and detection of articles by the radar unit is carried out within a limited region along the traveling path selected.

14 Claims, 6 Drawing Sheets

OBSTACLE SENSING APPARATUS FOR VEHICLES

BACKGROUND OF THE INVENTION

1. Field of the Invention

This invention relates to an obstacle sensing apparatus mounted on a vehicle in order to prevent accidents such as collisions. More particularly, the invention relates to an apparatus for predicting the path of travel of a vehicle and sensing obstacles present in the path of travel.

2. Description of the Related Art

As disclosed in the specification of Japanese Patent Publication No. 51-7892, for example, a known obstacle sensing apparatus of this type includes a radar unit for transmitting radar waves such as ultrasonic waves or radio waves ahead of an automotive vehicle and sensing obstacles such as vehicles located ahead, turning means for turning the radar unit in the horizontal direction, and steering angle sensing means for sensing the steering angle of the vehicle, wherein the radar unit is turned through a prescribed angle by the turning means in conformity with the steering angle sensed by the steering angle sensing means, thereby orienting the radar waves in the traveling direction of the vehicle. In recent years, an obstacle sensing apparatus for vehicles has been developed in which a scanning-type radar unit is used to scan a comparatively wide angle in the horizontal direction. During scanning, only obstacles in the region along the vehicle traveling path predicted based upon the steering angle are picked out by a microcomputer from the information obtained by scanning, whereby the detection of obstacles by the radar unit is performed while being limited to the aforesaid region by means of software.

In these types of obstacle sensing apparatus, the detection of obstacles by the radar unit is limited to the region along the vehicle traveling path by hardware or software means. In either case, when the traveling path of the vehicle is predicted, the prediction is made based upon the vehicle steering angle sensed by steering angle sensing means. This predicting method involves certain problems.

The first problem is that when a curved segment of a road such as a thruway is canted, the steering angle does not agree with the actual turning angle of the vehicle. The turning radius of the vehicle traveling path predicted based upon the steering angle is greater than the radius of curvature of the actual traveling path, namely the curved road.

The second problem is that it is normal for the driver to be constantly turning the steering wheel back and forth slightly even while the vehicle is traveling along a straight line. Consequently, when the vehicle traveling path is predicted by following up the steering angle, the path predicted will not coincide with the actual traveling path.

SUMMARY OF THE INVENTION

Accordingly, an object of the present invention is to provide an obstacle sensing apparatus for vehicles, in which detection of obstacles can be performed efficiently by predicting the traveling path of the vehicle appropriately when detection of obstacles by a radar unit is limited to a region along the traveling path.

According to a first aspect of the present invention, the foregoing object is attained by providing an obstacle sensing apparatus for an automotive vehicle having a radar unit for transmitting radar waves ahead of the vehicle and sensing obstacles present in front of the vehicle, comprising steering angle sensing means for sensing steering angle of the vehicle, yaw rate sensing means for sensing yaw rate produced by the vehicle, vehicle velocity sensing means for sensing velocity of the vehicle, first traveling-path predicting means for predicting a traveling path of the vehicle based upon the steering angle sensed by the steering angle sensing means, second traveling-path predicting means for predicting a traveling path of the vehicle based upon the yaw rate sensed by the yaw rate sensing means, and selecting means for selecting one of the traveling paths, which have been predicted by the first and second traveling-path predicting means, in dependence upon the operating state of the vehicle.

According to a second aspect of the present invention, the foregoing object is attained by providing an obstacle sensing apparatus for an automotive vehicle having a radar unit for transmitting radar waves ahead of the vehicle and sensing obstacles present in front of the vehicle, comprising steering angle sensing means for sensing a steering angle of the vehicle, first traveling-path predicting means for predicting a traveling path of the vehicle based upon the steering angle sensed by the steering angle sensing means, second traveling-path predicting means for predicting that what is directly ahead of the vehicle is a traveling path, and selecting means for selecting one of the traveling paths, which have been predicted by the first and second traveling-path predicting means, in dependence upon the operating state of the vehicle.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENT

A preferred embodiment of the present invention will now be described in detail with reference to the drawings.

Figure 1:
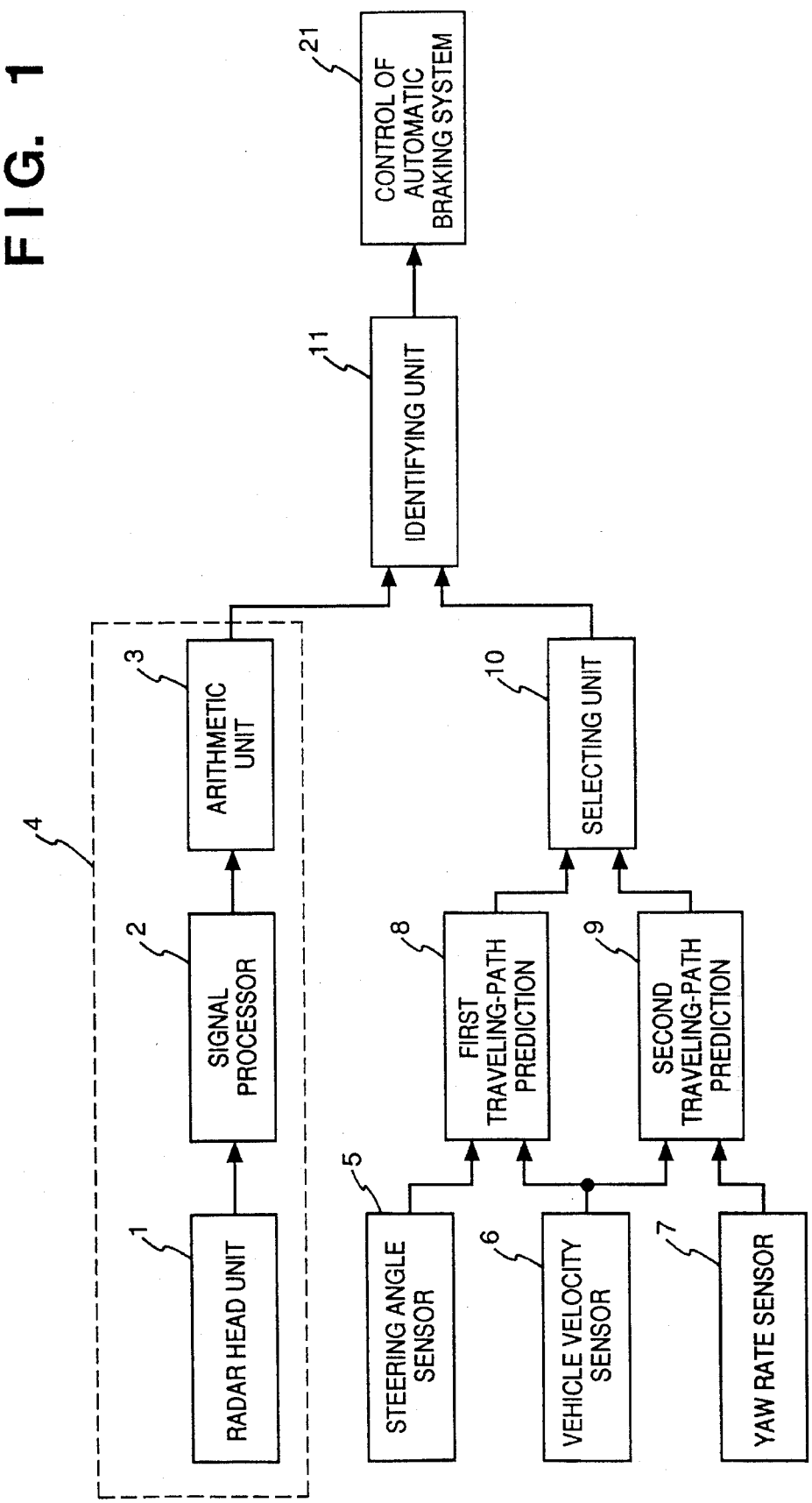
FIG. 1 is a block diagram illustrating the overall configuration of an obstacle sensing apparatus for vehicles according to a preferred example of the present invention.

FIG. 1 is a block diagram illustrating the overall configuration of an obstacle sensing apparatus for a vehicle according to a preferred embodiment of the invention. The obstacle sensing apparatus in this embodiment is installed in an automotive vehicle along with an automatic braking system for automatically braking the wheels of the vehicle, and the sensing apparatus is so adapted that information representing obstacles sensed thereby is supplied for use in controlling the automatic braking system.

As shown in FIG. 1, a radar head unit 1 provided on the front of the vehicle body transmits a pulsed laser beam in the forward direction of the vehicle from a transmitter. The laser pulses serve as radar waves. The radar head 1 also has a receiver for receiving waves reflected back upon striking an obstacle such as a vehicle located ahead. The radar head unit 1 is of the scanning type, in which the pulsed laser beam transmitted by the transmitter is caused to scan across a comparatively wide angle in the horizontal direction. A signal from the radar head unit 1 enters an arithmetic unit 3 through a signal processor 2. Based upon a time delay required for the transmitted laser beam pulse to be received as a reflected laser beam pulse thereof, the arithmetic unit 3 calculates the distance between the vehicle and each obstacle present within the scanned region as well as the direction to the each obstacle as seen from the vehicle. Thus, the laser head unit 1, signal processor 2 and arithmetic unit 3 construct a scanning-type radar unit 4 for sensing obstacles present ahead of the automotive vehicle.

A steering angle sensor 5 serves as steering-angle sensing means for sensing the steering angle of a steering wheel. A vehicle velocity sensor 6 senses the velocity of the automotive vehicle. A yaw rate sensor 7 serves as yaw rate sensing means for sensing the yaw rate produced by the vehicle. The detection signal from the steering angle sensor 5 enters first traveling-path predicting means 8, the detection signal from the vehicle velocity sensor 6 enters the first traveling-path predicting means 8 and second traveling-path predicting means 9, and the detection signal from the yaw rate sensor enters the second traveling-path predicting means 9.

The first traveling-path predicting means 8 predicts the path of travel of the vehicle based upon a steering angle $\theta_H$ and vehicle velocity $V_0$. More specifically, the first traveling path predicting means 8 calculates radius of curvature $R_1$ of the traveling path (see the radius of curvature R in FIG. 5). Further, the first traveling-path predicting means 8 calculates a lateral slip angle $\beta_1$ of the vehicle. The radius of curvature $R_1$ and lateral slip angle $\beta_1$ are calculated in accordance with Equations (1) below.

$$R_1 = (1 + A \cdot V_0^2) \cdot l \cdot N/\theta_H$$

$$\beta_1 = [-1 + \{m/(2 \cdot l)\} \cdot \{l_f/(l_r \cdot K_r)\} \cdot V_0^2]/(1 + A \cdot V_0^2) \cdot (l_r/l) \cdot (\theta_H/N) \quad \text{(Eq. 1)}$$

where

A: stability factor

N: steering gear ratio l: wheel base $l_f$: distance between vehicle center of gravity and front wheels $l_r$: distance between vehicle center of gravity and rear wheels m: vehicle mass $K_r$: cornering power per rear wheel The second traveling-path predicting means 9 predicts the path of travel of the vehicle based upon a yaw rate $\gamma$ and vehicle velocity $V_0$. More specifically, the predicting means 9 calculates radius of curvature $R_2$ of the traveling path (see the radius of curvature R in FIG. 5). Further, the second traveling-path predicting means 9 calculates a lateral slip angle $\beta_2$ of the vehicle. The radius of curvature $R_2$ and lateral slip angle $\beta_2$ are calculated in accordance with Equations (2) below.

$$R_2 = V_0/\gamma \quad \text{Eq. (2)}$$

$$\beta_2 = \beta_1 - m \cdot [(l_f^2 \cdot K_f + l_r^2 \cdot K_r)/(2 \cdot l^2 \cdot A \cdot K_f \cdot K_r)] \cdot (1/R_1 - 1/R_1)$$

$$= \beta_1 + [(l_f^2 \cdot K_f + l_r^2 \cdot K_r)/(l_f \cdot K_f - l_r \cdot K_r)] \cdot (1/R_2 - 1/R_1)$$

where $R_1$, $\beta_1$ are values calculated in accordance with Equations (1) and $K_f$ represents cornering power per front wheel.

Furthermore, selecting unit 10 is adapted to select, in dependence upon the magnitude of the steering angle $\theta_H$ sensed by the steering angle sensor 5, either the path of travel predicted by the first traveling-path predicting means 8 or the path of travel predicted by the second traveling-path predicting means 9. Identifying unit 11 identifies the obstacle nearest the vehicle (this obstacle shall be referred to as the "nearest obstacle" below) from among the obstacles sensed by the radar unit 4 within a region along the path of travel selected by the selecting unit 10. The identification of the nearest obstacle by the identifying unit 11 is the same as sensing an obstacle by the radar unit 4 upon limiting detection to a region along the traveling path selected by the selecting unit 10. Accordingly, the identifying unit 11 possesses the function of control means for performing control in such a manner that detection of obstacles by the radar unit 4 is carried out upon being limited to a region along the traveling path selected by the selecting unit 10. The information representing the nearest obstacle identified by the identifying unit 11 enters a controller 21 of an automatic braking system so as to be utilized in, say, a judgment for determining the danger of collision between the vehicle and an obstacle.

Figure 2:
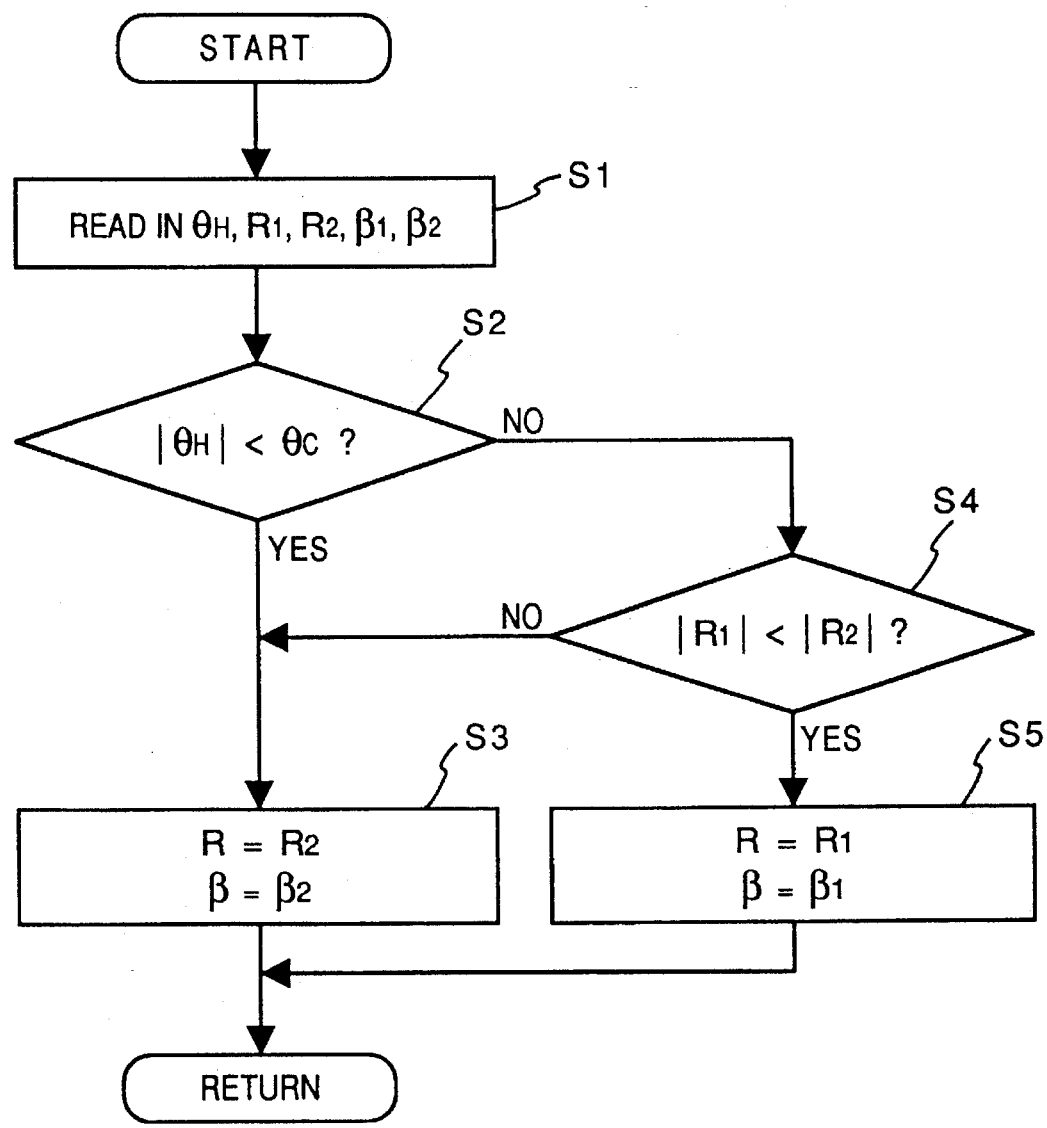
FIG. 2 is a flowchart illustrating an example of selection of a traveling path by selecting means.
Figure 3:
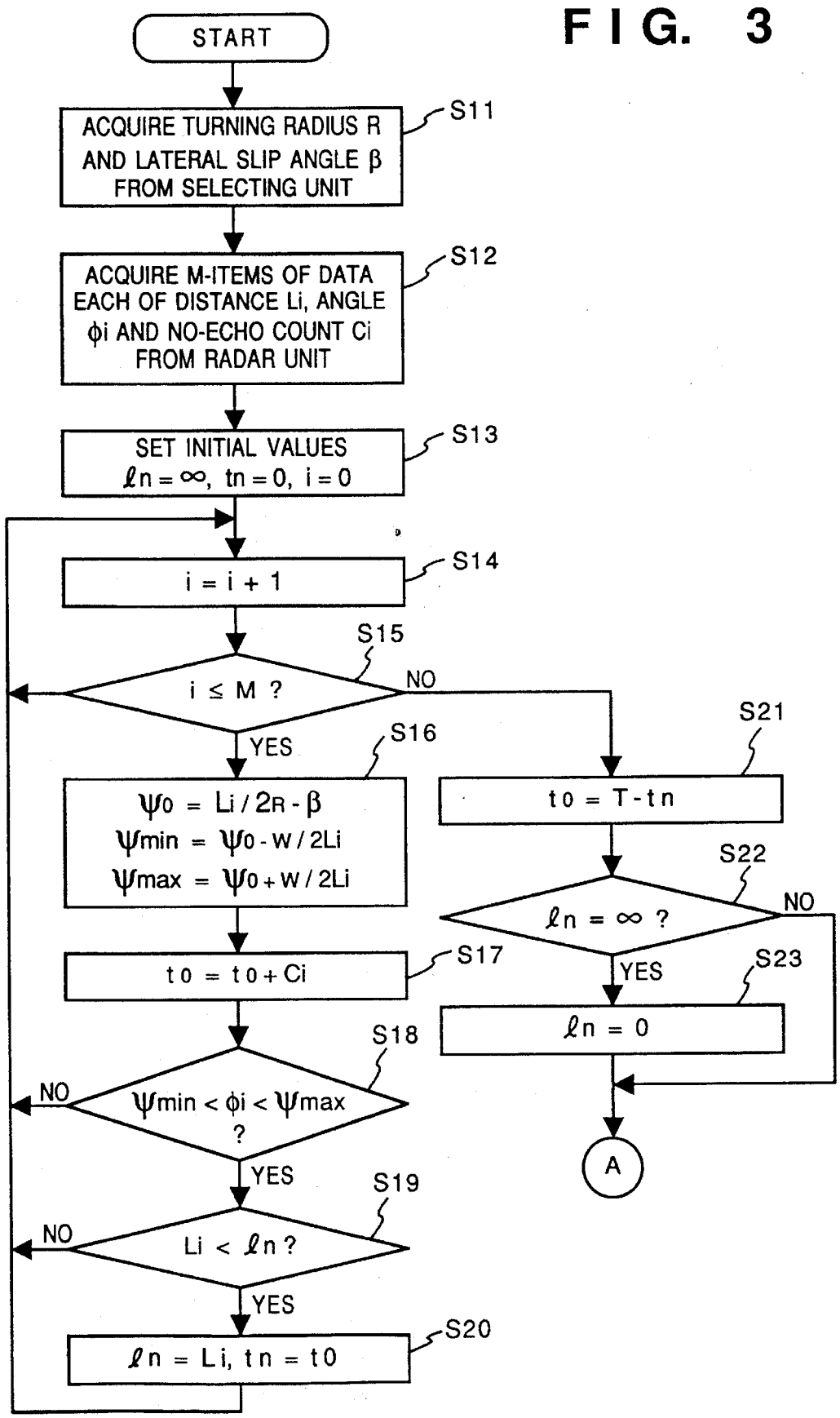
FIG. 3 is a flowchart illustrating an example of identification of the nearest obstacle by identifying means.
Figure 4:
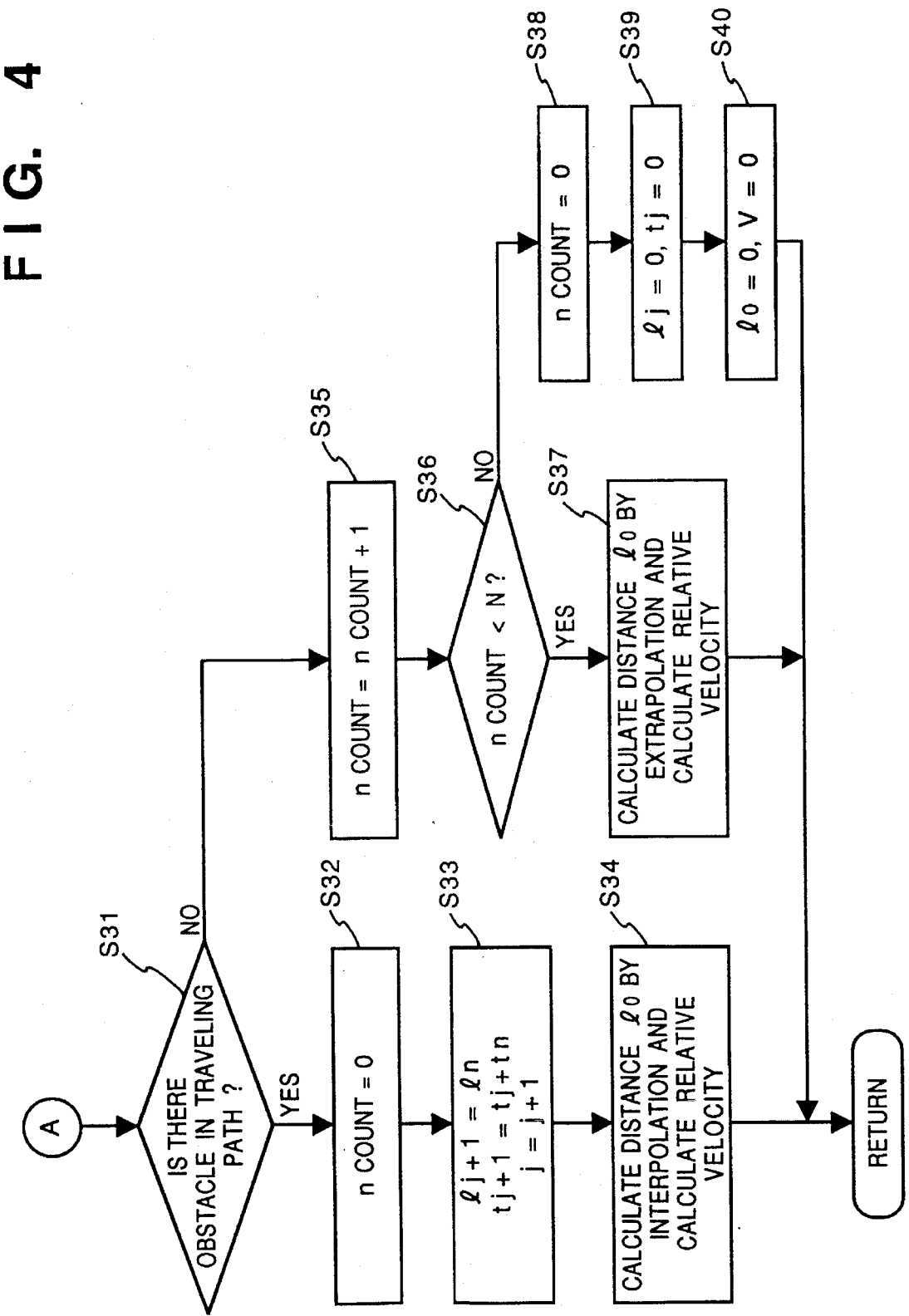
FIG. 4 is a flowchart illustrating an example in which the distance between an automotive vehicle and the nearest obstacle is calculated by identifying means.

FIG. 2 is a flowchart illustrating a method of selecting a traveling path by the selecting unit 10, FIG. 3 is a flowchart illustrating a method of identifying the nearest obstacle by the identifying unit 11, and FIG. 4 is a flowchart illustrating a method of calculating the distance between and an automotive vehicle and the nearest obstacle by the identifying unit 11. The selection of the path of travel by the selecting unit 10 is carried out in accordance with the flowchart of FIG. 2. The identification of the nearest obstacle by the identifying unit 11 is performed in accordance with the flowcharts of FIGS. 3 and 4.

As shown at step S1 in FIG. 2, the steering angle $\theta_H$ sensed by the steering angle sensor 5, and the radii of curvature $R_1$, $R_2$ of the traveling paths and the lateral slip angles $\beta_1$, $\beta_2$ predicted by the traveling-path predicting means 8, 9, respectively, are read in first after the system is started. It is determined at step S2 whether the absolute value of the steering angle $\theta_H$ is less than a predetermined angle $\theta_c$. When the steering angle $\theta_H$ is less than the predetermined angle $\theta_c$ (when a YES decision is rendered at step S2), the program proceeds to step S3. Here the path of travel predicted by the second traveling-path predicting means 9 is selected, $R_2$ is set as the radius of curvature of the path of travel and $\beta_2$ is set as the lateral slip angle $\beta$ of the vehicle, after which the program returns.

On the other hand, when the steering angle $\theta_H$ is equal to or greater than the predetermined angle $\theta_c$ (when a NO decision is rendered at step S2), the program proceeds to step S4. Here the absolute value of the radius of curvature $R_1$ of the traveling path predicted by the first traveling-path predicting means 8 is compared with the absolute value of the radius of curvature $R_2$ of the traveling path predicted by the second traveling-path predicting means 9 to determine which is smaller. When the radius of curvature $R_1$ of the traveling path predicted by the first traveling-path predicting means 8 is smaller (i.e., when a YES decision is rendered at step S4), the program proceeds to step S5. Here $R_1$ is set as the radius of curvature R of the path of travel and $\beta_1$ is set as the lateral slip angle $\beta$ of the vehicle, after which the program returns. On the other hand, when the radius of curvature $R_2$ of the traveling path predicted by the second traveling-path predicting means 9 is smaller (i.e., when a NO decision is rendered at step S4), the program proceeds to step S3. Here $R_2$ is set as the radius of curvature R of the path of travel and $\beta_2$ is set as the lateral slip angle $\beta$ of the vehicle. R1 and R2 are compared at step S4 and the smaller radius of curvature is selected as the path of travel.

In FIGS. 3 and 4, step S11 calls for the data from the selecting unit 10, namely the turning (curvature) radius R and lateral slip angle $\beta$, to be acquired immediately after the system is started. This is followed by step S12, at which the data from the arithmetic unit 3 of the radar unit 4 is acquired. The data from the radar unit 4 comprises data representing M-number of obstacles. The data representing each obstacle includes the distance $L_i$ (i=1~M) between the obstacle and the vehicle, the horizontal angle $\phi_i$ of the obstacle from the center line of the radar unit 4 (which line approximately coincides with the center line of the vehicle), and a no-echo counter $C_i$. The no-echo counter $C_i$ indicates the time required between one obstacle (i=n) and an obstacle (i=n−1) neighboring this obstacle on the leading side of the scanning direction when the radar unit 4 is performing scanning in one direction.

The program then proceeds to step S13, where $l_n$ is made infinitely large, $t_n$ is made 0 and i is made 0 as initial settings. Here $l_n$ signifies the distance between the vehicle and the obstacle nearest to the vehicle from among the obstacles present in the path of travel.

After the initial settings of step S13 have been made, the program proceeds to step S14, at which i is counted up by one count. The program then proceeds to step S15, at which it is determined whether i is equal to or less than M. When i is equal to or less than M (i.e., when a YES decision is rendered at step S15), the program proceeds to step S16, at which $\Psi_0$, $\Psi_{min}$, $\Psi_{max}$ are calculated in accordance with Equations (3) below.

$$\left. \begin{array}{l} \Psi_0 = (L_i/2R) - \beta \\ \Psi_{min} = \Psi_0 - (W/2L_i) \\ \Psi_{max} = \Psi_0 + (W/2L_i) \end{array} \right\} \quad \text{Eq. (3)}$$

Figure 5:
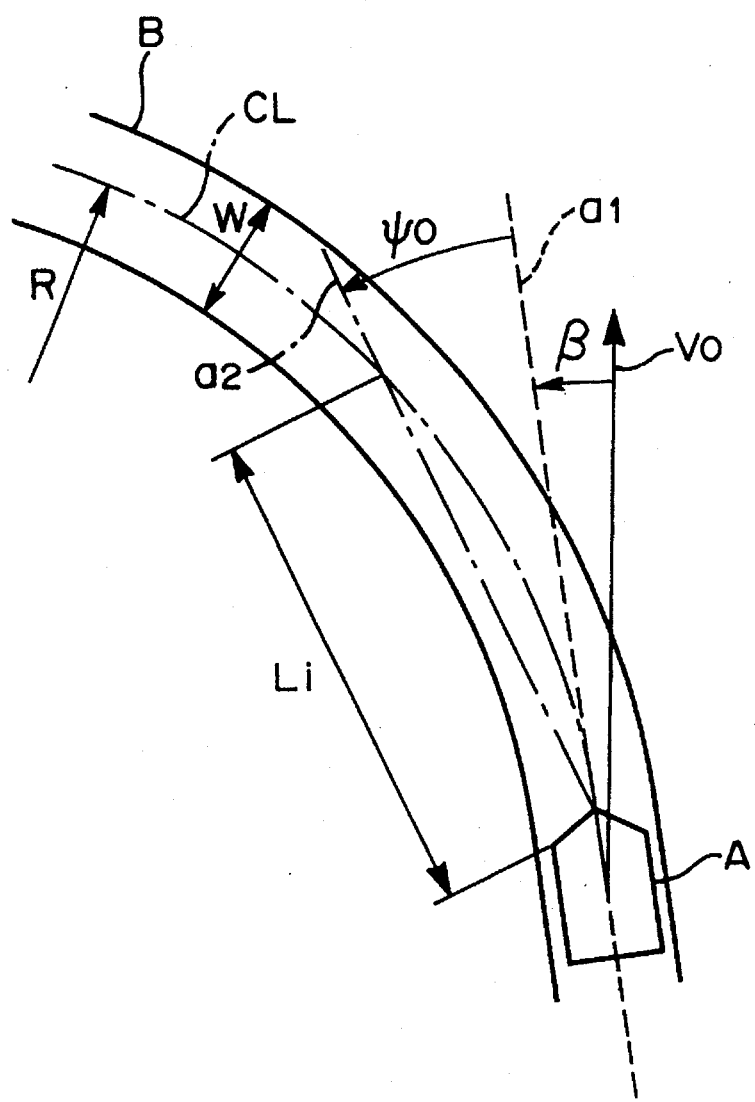
FIG. 5 is a schematic view showing the positional relationship between an automotive vehicle and a path of travel.

As illustrated in FIG. 5, an included angle $\Psi_0$ is an angle which a straight line $a_2$ connecting an automotive vehicle A and a center line CL of a traveling path B a distance $L_i$ ahead makes with a center line (the center line of the radar unit 4) $a_1$ of the vehicle A. Further, a road width W represents distance laterally of the traveling path B. Included angles $\Psi_{min}$ and $\Psi_{max}$ are angles which straight lines connecting the vehicle A and left and right edges of the traveling path the distance $L_i$ ahead make with the center line (the center line of the radar unit 4) $a_1$ of the vehicle A. It should be noted that sign is taken as being positive in the clockwise direction. Furthermore, the radius of curvature R in FIG. 5 is the radius of curvature of the traveling path B. This is the turning radius of the vehicle. The lateral slip angle $\beta$ is the included angle between the traveling direction of the vehicle A (which direction has a velocity vector of $V_0$) and the center line $a_1$.

Next, the program proceeds to step S17, at which the no-echo count $C_i$ is added to $t_0$ and the sum is set anew as $t_0$. This is followed by step S18, at which it is determined whether the horizontal angle $\phi_i$ of the obstacle is a value between $\Psi_{min}$ and $\Psi_{max}$, i.e., whether the obstacle is on the traveling path B or not. The program then proceeds to step S19, at which it is determined whether the distance $L_i$ between the obstacle and the vehicle is less than $l_n$. When $L_i$ if found to be smaller than ln at step S19 (i.e., when a YES decision is rendered at this step), the program proceeds to step S20, where the distance $L_i$ is set to $l_n$ and $t_0$ is set to $t_n$. The program then returns to step S14. When the horizontal angle $\phi_i$ of the obstacle is not a value between $\Psi_{min}$ and $\Psi_{max}$, or when $L_i$ is equal to or greater than $l_n$ (i.e., when a NO decision is rendered at step S18 or S19), the program returns to step S14.

By repeating the steps from S14 to S20, the obstacle nearest the vehicle A on the traveling path B of the vehicle A is identified from among the M-number of obstacles sensed by the radar unit 4, and the distance between the nearest obstacle and the vehicle is set as $l_n$.

When the checking of all M of the obstacles ends (i.e., when a NO decision is rendered at step S15), the program proceeds to step S21, at which a value obtained by subtracting $t_n$ from T is made $t_0$ (=T−$t_n$). Here T is the time needed for one frame of scanning of the radar unit 4, and $t_n$ is the time required from, the substitution ($t_n$=$t_0$) of step S20, for the scanning of the nearest obstacle at one frame of scanning of the radar unit 4. Accordingly, $t_0$ at step S21 is the time from the moment the nearest obstacle is sensed to the end of one frame of scanning of the radar unit 4. By adding the no-echo count $C_i$ to this time $t_0$ as the time up to the detection of the nearest obstacle at the next one frame of scanning of the radar unit 4, the time needed to detect the nearest obstacle twice during two frames of scanning is measured. This period of time is used in calculating the relative velocity V between the vehicle and the nearest obstacle at step S34, described below.

Next, at step S22, it is determined whether $l_n$ is infinitely large, namely whether the initially set value is still in effect. If the initially set value is still in effect (i.e., if a YES decision is rendered), then ln is set to 0 at step S23 and the program then proceeds to step S31. If ln is a finite value (i.e., if a NO decision is rendered), then the program proceeds directly to step S31 (FIG. 4).

FIG. 4 is a flowchart from step S31 onward. It is determined at step S31 whether there is an obstacle (the nearest obstacle) in the path of travel. When the nearest article is present (i.e., when a YES decision is rendered), the n count is set to 0 at step S32 and various substitutions for measuring relative velocity are carried out at step S33. This is followed by step S34, at which the distance $l_0$ between the vehicle at the present time and the nearest obstacle is calculated by an interpolation method such as the law of least squares and the relative velocity V between the vehicle at the present time and the nearest obstacle is calculated using the distance $l_0$. The program then returns.

When there is no nearest obstacle (i.e., when a NO decision is rendered at step S31), the n count is incremented (n=n+1) at step S35, after which it is determined at step S36 whether the n count is less than a predetermined number N. When the n count is less than the predetermined number N (i.e., when a YES decision is rendered), the distance $l_0$ between the obstacle and the vehicle at the present time is calculated at step S37 by extrapolation using the data that prevailed previously. In addition, the relative velocity V between the vehicle at the present time and the nearest obstacle is calculated using the distance $l_0$. The program then returns.

When there is no nearest obstacle (i.e., when a NO decision is rendered at step S36), or in other words, when the nearest obstacle vanishes and a prescribed period of time elapses, the n count is set to 0 at step S38, after which $l_j$, $t_j$ are set to 0 at step S39. The distance $l_0$ and the relative velocity V between the vehicle and the nearest obstacle are then set to 0 at step S40, after which the program returns.

The actions and effects of the foregoing embodiment, and in particular the selection of the traveling path by the selecting unit 10, will now be described in accordance with conditions of the road.

When an automotive vehicle travels while negotiating a curve on a curved road that is canted (inclined), the vehicle undergoes turning motion owing to the cant even if the steering wheel is not turned a large amount. As a result, the radius of curvature $R_2$ of the traveling path predicted by the second traveling-path predicting means 9 based upon the yaw rate $\gamma$ becomes smaller than the radius of curvature $R_1$ of the traveling path predicted by the first traveling-path predicting means 8 based upon the steering angle $\theta_H$. Accordingly, the second traveling path predicted by the second traveling-path predicting means 9 based upon the yaw rate $\gamma$ is selected and the radius of curvature $R_2$ of this traveling path is utilized in the identification of the nearest obstacle by the identifying unit 11. As a result, the identification of the nearest obstacle can be performed accurately by predicting the traveling path appropriately without being influence by the cant of the road.

When the vehicle travels while negotiating a sharp curve, the first traveling-path predicting means 9 predicts that the traveling path will have the smaller radius of curvature $R_1$ in conformity with the steering angle $\theta_H$, which will now have a larger value. This traveling path is selected by the selecting unit 10 and is utilized in the identification of the nearest obstacle by the identifying means 11. As a result, the prediction of the traveling path can be performed appropriately in full conformity with the sharp turning operation of the vehicle, thereby making it possible to improve reliability.

When the vehicle travels on a straight road, i.e., when the steering angle $\theta_H$ is small, the selecting unit 10 selects the traveling path predicted by the second traveling-path predicting means 9 based upon the yaw rate $\gamma$, and the radius of curvature $R_2$ of this traveling path is utilized in the identification of the nearest obstacle by the identifying unit 11. Though the steering wheel is being turned slightly at this time, the yaw rate $\gamma$ is not produced and, hence, the predicted traveling path is a straight path extending linearly in the traveling direction (straight ahead) of the vehicle. Accordingly, the prediction of the traveling path can be performed appropriately without any unnecessary follow-up of steering wheel operation.

Figure 6:
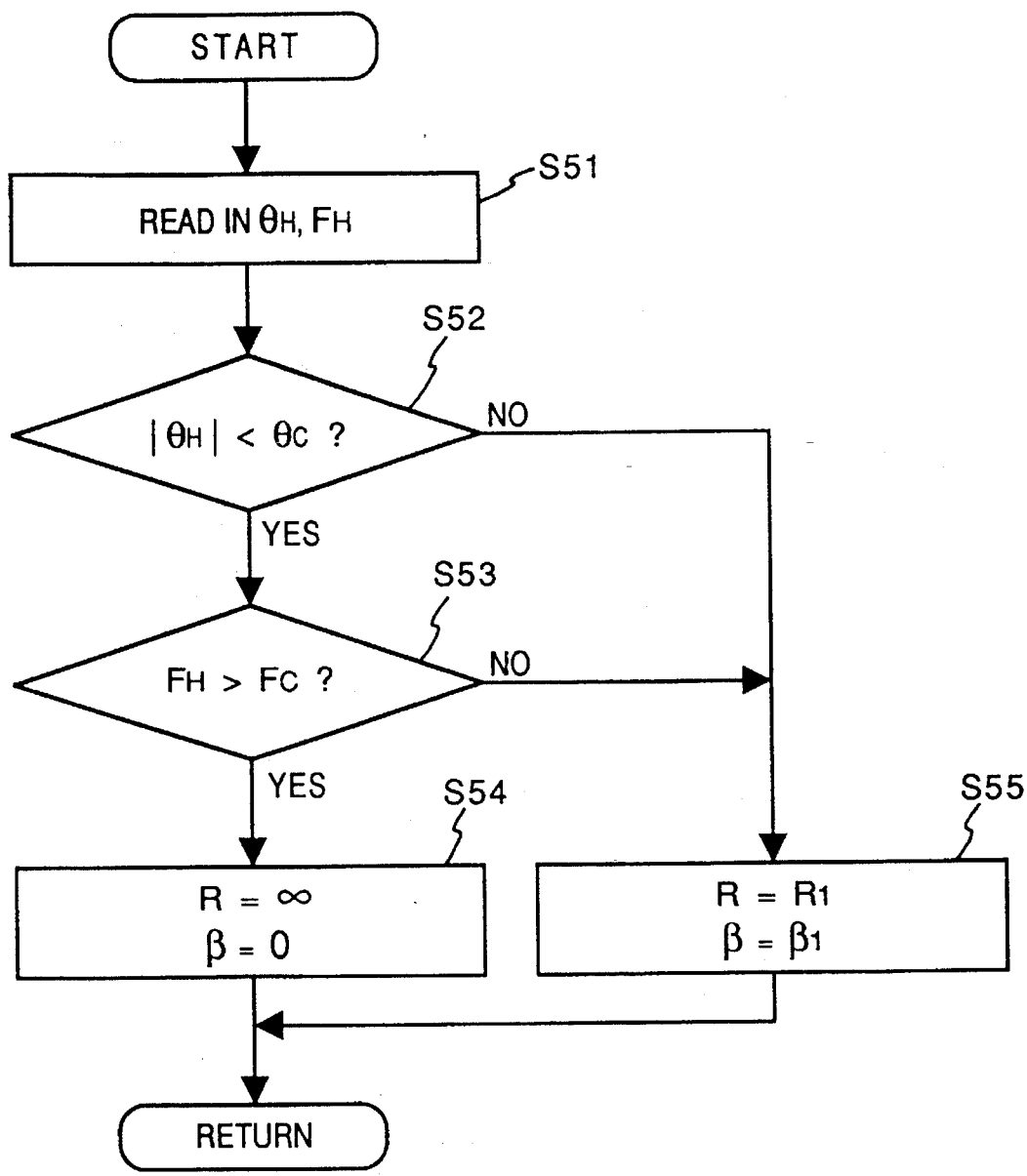
FIG. 6 is a flowchart illustrating an example of a modification of this embodiment of selecting traveling path by selecting means.

FIG. 6 is a flowchart illustrating a modification of a method of selecting a traveling path by the selecting unit 10 (see FIG. 1) according to this embodiment.

As shown at step S51 in FIG. 6, the steering angle $\theta_H$ sensed by the steering angle sensor 5 and a steering-angle frequency (amount of change) $F_H$ are read in first after the system is started. The steering-angle frequency (amount of change) $F_H$ is calculated by differentiating the steering angle $\theta_H$ a single time or is sensed directly by a sensor.

Next, it is determined at step S52 whether the absolute value of the steering angle $\theta_H$ is less than the predetermined angle $\theta_c$, and it is determined at step S53 whether the steering-angle frequency (amount of change) $F_H$ is greater than a predetermined value $F_c$. When the absolute value of the steering angle $\theta_H$ is less than the predetermined angle $\theta_c$ and the steering-angle frequency (amount of change) $F_H$ is greater than the predetermined value $F_c$ (i.e., when YES decisions are rendered at both steps S52 and S53), the radius of curvature R of the traveling path is set to infinity and the lateral slip angle $\beta$ of the vehicle is set to 0 at step S54, after which the program returns. On the other hand, when the absolute value of the steering angle $\theta_H$ is equal to or greater than the predetermined angle $\theta_c$ or the steering-angle frequency (amount of change) $F_H$ is equal to or less than the predetermined value $F_c$ (i.e., when a NO decision is rendered at either step S52 or S53), the values calculated in accordance with Equations (1) set forth earlier, namely the radius of curvature $R_1$ of the traveling path and the lateral slip angle $\beta_1$ of the vehicle predicted by the first traveling-path predicting means 8 based upon the steering angle $\theta_H$, are set respectively as the radius of curvature R of the traveling path and the lateral slip angle $\beta$ of the vehicle, after which the program returns. It should be noted that this modification is equivalent to the second traveling-path predicting means 9 predicting unconditionally that the traveling path of the vehicle is a straight road lying directly in front of the vehicle and making the radius of curvature infinitely large.

In this modification, when the steering wheel is actually turned, the traveling path predicted based upon the steering angle $\theta_H$ is selected and is utilized in the identification of the nearest obstacle by the identifying unit 11. On the other hand, when the steering angle $\theta_H$ is smaller than the predetermined angle $\theta_c$ and the steering-angle frequency (amount of change) $F_H$ is greater than the predetermined value $F_c$, that is, when the vehicle is traveling straight ahead while the steering wheel is being turned slightly back and forth, a straight path directed immediately ahead of the vehicle is selected and the infinite radius of curvature R is utilized in the identification of the nearest obstacle by the identifying unit 11. Accordingly, it is as if a dead zone were provided with regard to the prediction of the traveling bath based upon the steering angle. As a result, the prediction of a traveling path that unnecessarily follows up the steering angle $\theta_H$ can be prevented, and it is possible to predict the traveling path and, hence, detect obstacles, in an appropriate manner.

In the embodiment described above, an arrangement is set forth in which detection of obstacles is performed over a comparatively large angle in the horizontal direction by the radar unit 4, and only obstacles present in the path of travels are picked out from among the sensed obstacles while detection is in progress, thereby limiting, by software means, the detection of obstacles by the radar unit 4 to a region along the path of travel. However, it goes without saying that the present invention can be similarly applied to an arrangement in which a radar unit having a narrow detection angle is provided so as to be capable of turning in the horizontal direction, and a radar detection area is provided in the direction of the traveling path of the vehicle, thereby limiting, by hardware means, the detection of obstacles by the radar unit to a region along the path of travel.

In accordance with the present invention, as evident from the foregoing description, a first traveling path is predicted based upon the steering angle of an automotive vehicle, a second traveling path is predicted based upon a yaw rate produced by the vehicle, and either of the two traveling paths is selected in dependence upon the operating state of the vehicle so detection of obstacles by a radar unit is performed upon being limited to a region along the traveling path selected. As a result, prediction of traveling path can be performed appropriately in conformity with the operating state of the vehicle and detection of obstacles can be performed in an efficient manner. In particular, as evident from the modification of the embodiment, the second traveling path is selected when the steering angle is smaller than a predetermined value. When the steering angle is greater than a predetermined value, whichever of the first and second traveling paths has the smaller radius of curvature is selected. When this is done, the traveling path of the vehicle can be predicted appropriately as being a curved road close to reality in conformity also with the conditions of a road having a cant.

Similarly, as evident from the modification of the embodiment, a first traveling path of the vehicle is predicted based upon the steering angle of the vehicle, and what is directly ahead of the vehicle is predicted as being a traveling path. One of these traveling paths is selected in dependence upon the operating state of the vehicle so detection of obstacles by the radar unit is performed upon being limited to a region along the traveling path selected. As a result, prediction of traveling path can be performed appropriately in conformity with the operating state of the vehicle and detection of obstacles can be performed in an efficient manner. In particular, as set forth in claim 11, when the steering angle is small and the turning angle frequency (amount of change) is larger, the second traveling path is selected, whereas the first traveling path is selected at all other times. When this is done, a so-called dead zone is provided with regard to the prediction of the traveling bath based upon the steering angle. As a result, the prediction of a traveling path that unnecessarily follows up the steering angle can be prevented.

The present invention is not limited to the above embodiment and various changes and modifications can be made within the spirit and scope of the present invention. Therefore, to apprise the public of the scope of the present invention, the following claims are made.

What is claimed is:

1. An obstacle sensing apparatus for an automotive vehicle having a radar unit for transmitting radar waves ahead of the vehicle and sensing obstacles present ahead of the vehicle by receiving reflected radar waves from said obstacles, comprising:

(a) steering angle sensing means for sensing steering angle of the vehicle;

(b) yaw rate sensing means for sensing yaw rate produced by the vehicle;

(c) first traveling-path predicting means for predicting a first traveling path of the vehicle based upon the steering angle sensed by said steering angle sensing means;

(d) second traveling-path predicting means for predicting a second traveling path of the vehicle based upon the yaw rate sensed by said yaw rate sensing means; and (e) selecting means for selecting one of the first and second traveling paths, which have been predicted by said first and second traveling-path predicting means, in dependence upon the operating state of the vehicle and wherein the sensing of the obstacles is carried out within a limited region along the selected traveling path.

2. The apparatus according to claim 1, further comprising vehicle velocity detecting means for detecting velocity of the vehicle, wherein said first traveling-path predicting means calculates radius of curvature of the first traveling path based upon the steering angle sensed by said steering-angle sensing means and the vehicle velocity detected by said vehicle velocity detecting means, and calculates a first lateral slip angle of the vehicle.

3. The apparatus according to claim 1, further comprising vehicle velocity detecting means for detecting velocity of the vehicle, wherein said second traveling-path predicting means calculates radius of curvature of the second traveling path based upon the yaw rate sensed by said yaw rate sensing means and the vehicle velocity detected by said vehicle velocity detecting means, and calculates a second lateral slip angle of the vehicle.

4. The apparatus according to claim 1, wherein said selecting means selects the second traveling path predicted by said second traveling-path predicting means when the steering angle is less than a predetermined value, and selects whichever of the first and second traveling paths, which are predicted by said first and second traveling-path predicting means, has a smaller angle of curvature when the steering angle is equal to or greater than the predetermined value.

5. The apparatus according to claim 1, further comprising identifying means for identifying an obstacle nearest to the vehicle from among obstacles that are within an area along the one traveling path selected by said selecting means and that have been sensed by said radar unit.

6. The apparatus according to claim 5, wherein said identifying means includes radar unit control means for controlling said radar unit so that said radar unit is limited to detect said obstacles within an area along the one traveling path selected by said selecting means.

7. The apparatus according to claim 5, further comprising automatic braking control means for calculating relative velocity of the vehicle based upon distance between said obstacle identified by said identifying means and the vehicle, and controlling the vehicle based upon the relative velocity.

8. An obstacle sensing apparatus for an automotive vehicle having a radar unit for transmitting radar waves ahead of the vehicle and sensing obstacles present ahead of the vehicle by receiving reflected radar waves from said obstacles, comprising:

(a) steering angle sensing means for sensing steering angle and amount of change in the steering angle of the vehicle;

(b) first traveling-path predicting means for predicting a first traveling path of the vehicle based upon the steering angle sensed by said steering angle sensing means;

(c) second traveling-path predicting means for predicting a second traveling path of the vehicle which is directly ahead of the vehicle, based upon the amount of change in the steering angle sensed by said steering angle sensing means; and (d) selecting means for selecting one of the first and second traveling paths, which have been predicted by said first and second traveling-path predicting means, in dependence upon an operating state of the vehicles and wherein the sensing of the obstacles is carried out within a limited region along the selected traveling path.

9. The apparatus according to claim 8, wherein said first traveling-path predicting means sets a radius of curvature of the first traveling path and a lateral slip angle of the vehicle based upon the steering angle sensed by said steering angle sensing means.

10. The apparatus according to claim 8, wherein said second traveling-path predicting means predicts unconditionally that the second traveling path of the vehicle is directly in front of the vehicle and makes the radius of curvature infinitely large.

11. The apparatus according to claim 8, wherein said selecting means selects the second traveling path predicted by said second traveling-path predicting means when the steering angle sensed by said steering angle sensing means is less than a predetermined value and the amount of change in the steering angle is greater than a predetermined value, and selects the first traveling path predicted by said first traveling-path predicting means at all other times.

12. The apparatus according to claim 8, further comprising identifying means for identifying an obstacle nearest to the vehicle from among obstacles that are within an area along the one traveling path selected by said selecting means and that have been sensed by said radar unit.

13. The apparatus according to claim 12, wherein said identifying means includes radar unit control means for controlling said radar unit so that said radar unit is limited to detect said obstacles within an area along the one traveling path selected by said selecting means.

14. The apparatus according to claim 12, further comprising automatic braking control means for calculating relative velocity of the vehicle based upon distance between said obstacle identified by said identifying means and the vehicle, and controlling the vehicle based upon the relative velocity.

* * * * *

UNITED STATES PATENT AND TRADEMARK OFFICE
CERTIFICATE OF CORRECTION

PATENT NO. : 5,467,283
DATED : November 14, 1995
INVENTOR(S) : BUTSUEN, et al.

It is certified that error appears in the above-indentified patent and that said Letters Patent is hereby corrected as shown below:

Column 4, line 9 (equation 2) "$(1/R_1 - 1/R_1)$" should be --$(1/R_2 - 1/R_1)$--;

Column 10, line 27, "radar unit" should be --radar-unit--;

Column 10, line 57, "vehicles" should be --vehicle--;

Column 10, line 64, "steering angle" should be --steering-angle--;

Column 12, line 3, "radar unit" should be --radar-unit--.

Signed and Sealed this

Twenty-seventh Day of February, 1996

Attest:

BRUCE LEHMAN

Attesting Officer     Commissioner of Patents and Trademarks